B. F. KNERR.
HOG OILER.
APPLICATION FILED OCT. 7, 1916.

1,229,094.

Patented June 5, 1917.
2 SHEETS—SHEET 1.

Witness
Hugh H. Hill

Inventor
B. F. Knerr,
By Victor J. Evans
Attorney

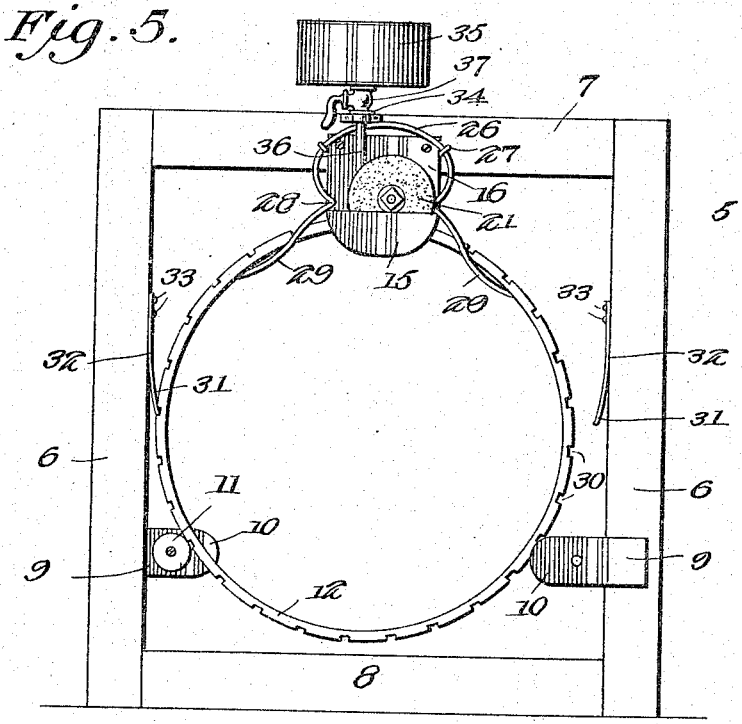
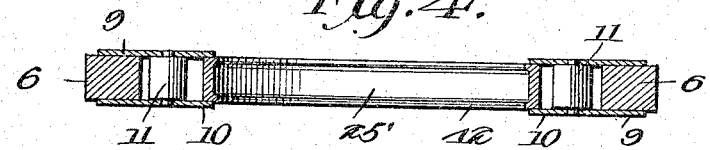
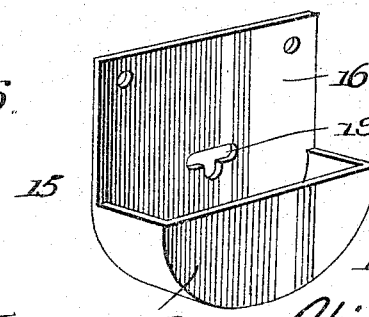

UNITED STATES PATENT OFFICE.

BENJIMAN F. KNERR, OF GRESHAM, NEBRASKA.

HOG-OILER.

1,229,094.     Specification of Letters Patent.    Patented June 5, 1917.

Application filed October 7, 1916. Serial No. 124,337.

*To all whom it may concern:*

Be it known that I, BENJIMAN F. KNERR, a citizen of the United States, residing at Gresham, in the county of York and State of Nebraska, have invented new and useful Improvements in Hog-Oilers, of which the following is a specification.

The present invention comprehends the provision of a device for enabling animals, such as hogs, to apply a liquid to its skin, for relieving the animal of vermin.

An object of the invention is the provision of a device of the above stated character, wherein use is made of a frame in which is rotatably mounted and adapted to actuate by the animal, a liquid applying device on which the liquid is applied.

A further object of the invention is the provision of a device of the above stated character possessing few and simple parts, capable of being operated in only one direction by the animal passing therethrough, thereby the animals will receive the benefit of having a sufficient quantity of liquid distributed to their bodies for the purpose of killing the vermin and contributing to the animal's comfort.

With the above and other objects in view, the invention consists in the novel features, details of construction and combination of parts which will hereinafter be more fully set forth, illustrated in the accompanying drawings and pointed out in the appended claims.

Fig. 4 is a horizontal section;

Fig. 5 is a front elevation showing the ring in locked position; and

Fig. 6 is a perspective view of the oil cup removed from the frame.

Figure 1:
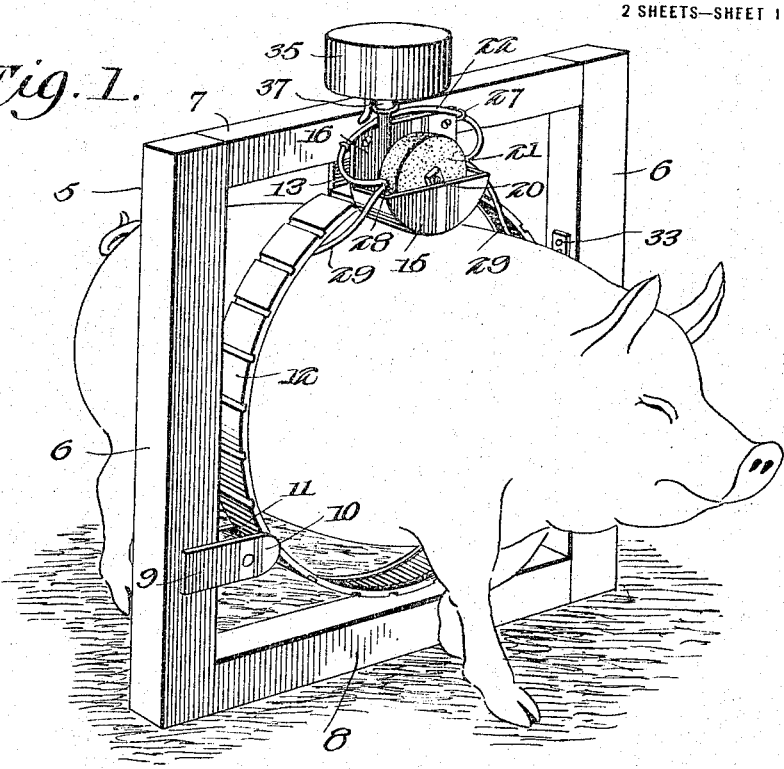
Figure 1 is a perspective view of the device showing the same in use.
Figure 2:
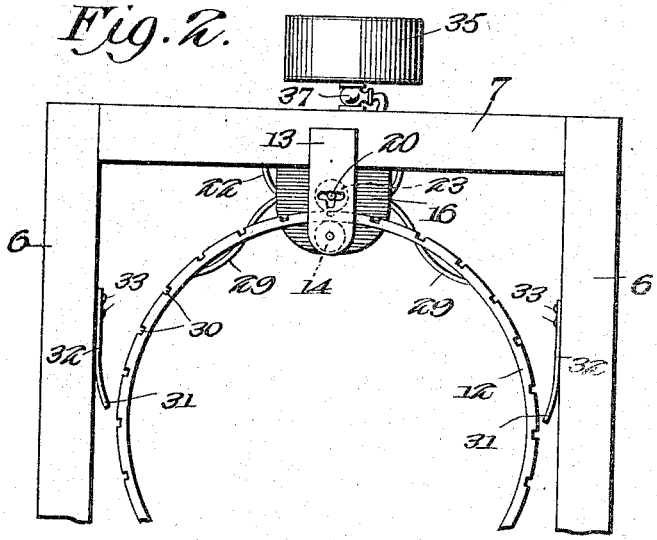
Fig. 2 is a fragmentary rear elevation.
Figure 3:
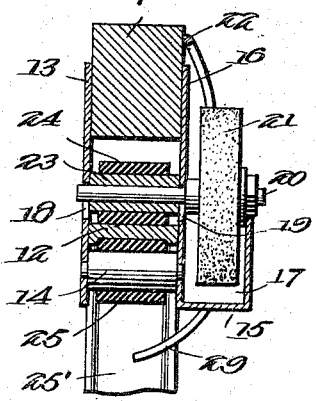
Fig. 3 is a vertical sectional view.

Referring more particularly to the accompanying drawings, 5 denotes a frame consisting of spaced vertical side bars 6 connected together at their upper ends by an upper end strip 7 and connected at their lower ends through the medium of a lower end strip 8. Riveted or otherwise suitably secured to the side strips 6 of the frame at a point adjacent the lower end strips 8 thereof is a pair of spaced cleats 9 and these cleats when in applied position extend horizontally of the frame and in alinement one to the other, positioning the free extremities 10 thereof a distance within the frame. Rollers 11 are journaled in the extremities 10 of the cleats and disposed transversely thereof, and serving to an extent as bearing rollers for supporting the annular ring 12 within the frame for rotary horizontal movements, while secured to the rear face of the end strips 7 and depending therefrom is a second bearing cleat 13 having one of the trunnions of the bearing roller 14 journaled therein, and the other trunnion of this bearing roller is journaled within the lubricant cup 15. It will, therefore, be seen that this second bearing roller 14 supports the ring and positions the same within the frame and flush with the outer and rear side faces thereof. This lubricant cup 15 may be constructed of any suitable material, and has the lip 16 thereof adjacent to the front face of the other end strip 7 of the frame in spaced parallel relation with the second cleat 13, and terminates at its lower end in a trough or receptacle 17 adapted to contain a quantity of liquid, such as lubricants or the like. The chief characteristic of this invention is the provision of a ring primarily intended to be self-actuated by the animal for the purpose of applying or distributing to the animal's body a predetermined quantity of the lubricant contained in the cup 15, in order to kill the vermin and thus contributing to the animal's comfort. To this end, I provide the second cleat 13 at a point substantially medially of its length with a T-shaped bearing slot 18, and I further provide the depending lip 16 of the oil cup with a T-shaped bearing slot 19 which slots aline transversely one with the other for loosely journaling therein the shaft 20.

Detachably mounted on one of the free extremities of this shaft 20 is a lubricant applying disk 21, preferably formed of felt or other like material. This disk 21 is so mounted on the shaft that the revolution of the shaft will cause the revolving of the disk in the receptacle or trough 17 of the lubricant cup in order to alternately distribute the contents of the cup to the wiper 22. Defined between the second bearing cleat 13 and the confronting face of the depending lip 16 of the oil cup and arranged on the shaft 20 is a roller 23 having a leather or rubber facing 24 secured thereto, serving to co-act with the outer circumference of the ring 12 while the bearing roller 14 is provided with a like facing 25 adapted to frictionally engage with the channel 25' formed on the inner circumference of the ring, thus upon the passing of the animal through the ring and engaging with the inner circumference thereof, will cause the said ring to be frictionally driven and in turn operate the disk 21, due to the frictional contact of the facing of the roller 23 therewith.

The wiper 22 is of resilient form, including a substantially circular body portion 26 secured to the front face of the upper end strip 7 through the medium of fasteners 27, positioning the body portion of the wiper upon the front face of the depending lip 16 of the oil cup, the lower extremities of said body portion being bent at opposite points to provide a pair of diametrically disposed convexed projections 28, terminating in a pair of outwardly diverging arms 29 having their lower extremities curved in a rearward direction, in order that the same may resiliently engage with the inner circumference of the ring 12.

It is necessary in order to effectively produce a successful operation of this invention, to employ means for preventing the rotation of the ring by the animal in only one direction, after the animal has moved the ring in a lateral direction of the frame, to permit of the animal receiving the full benefit of the lubricant applied in the container 25' formed on the inner circumference of the ring by the resilient arms 29 of the wiper. I therefore construct the ring 12 on the outer circumference thereof with a circumferential series of spaced grooves 30 adapted to alternately co-act with the inbent free extremities 31 of the spring tongues 32. These tongues are disposed vertically of the frame and secured to the confronting side faces of the side rails 6 thereof through the medium of fasteners 33. It will be further observed that providing the inner circumference of the ring 12 with the channel 25' serves to prevent the lubricant when applied thereto from being accidentally discharged therefrom until the animal has received the full benefit of the liquid or lubricant applied to the ring from the liquid cup. Mounted on the upper end strip 7 through the medium of a strap 34 is an oil reservoir 35 provided with a duct 36 having a valve 37 therein whereby oil may be supplied to the cup 15 as the occasion may so demand.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative and that such changes may be made when desired as are within the scope of the appended claims.

What is claimed as new, is:

1. In a liquid applying device for hogs, the combination with a frame, a hollow annular channeled member supported in said frame for rotary and lateral movements, and means for supplying a predetermined quantity of liquid to the inner circumference of said hollow annular channeled member.

2. In a liquid applying device for hogs, the combination with a frame, a hollow member supported in said frame for rotary and lateral movements, means for supplying a predetermined quantity of liquid to the inner circumference of the said hollow member, and means for preventing of a rotary movement of the hollow member in more than one direction while the lubricant is being applied to the hollow member.

3. In a liquid applying device for hogs, the combination with a frame provided with a series of bearing cleats, rollers journaled in said cleats, of a hollow annular member mounted upon said rollers for rotary and lateral movements, a cup supported on said frame and adapted to contain a predetermined quantity of liquid, and means associated with said cup for distributing the liquid therefrom to the inner circumference of said ring.

4. In a liquid applying device for hogs, the combination with a frame provided with a series of bearing cleats, rollers journaled in said cleats, of a hollow annular channeled member mounted upon said rollers for rotary and lateral movements, a cup supported on said frame and adapted to contain a predetermined quantity of liquid, and means associated with said cup for distributing the liquid contained therein to the inner circumference of said ring.

5. In a liquid applying device for hogs, the combination with a frame provided with a series of bearing cleats, rollers journaled in said cleats, of a hollow annular member mounted upon said rollers for rotary and lateral movements, a cup supported on said frame and adapted to contain a predetermined quantity of liquid, and means associated with said cup for distributing the liquid therefrom to the inner circumference of said ring, and means for preventing the hollow member being rotated more than one direction upon the distributing of the liquid thereon.

6. In a liquid applying device for hogs, the combination with a frame, of a hollow member journaled in said frame for rotary and lateral movements, a cup secured to the frame and adapted to contain a predetermined quantity of liquid, a shaft journaled in said cup, a disk on said shaft, and means on said shaft and frictionally engaging with the said hollow member for imparting movement to said disk, and means associated with said cup for distributing the liquid therefrom to the hollow member.

7. In a liquid applying device for hogs, the combination with a frame, of a hollow member journaled in said frame for rotary and lateral movements, a cup secured to the frame and adapted to contain a predetermined quantity of liquid, a shaft journaled in said cup, a disk on said shaft, and means on said shaft and frictionally engaging with the said hollow member for imparting movement to said disk, and means engaging with the disk for distributing the liquid therefrom to the inner circumference of the said hollow member.

8. In a liquid applying device for hogs, the combination with a frame, of a hollow channeled member journaled in said frame for rotary and lateral movements, a cup secured to the frame and adapted to contain a predetermined quantity of liquid, a shaft journaled in said cup, a disk on said shaft, and means on said shaft and frictionally engaging with the said hollow member for imparting movement to said disk, and means engaging with the disk for distributing the liquid therefrom to the inner circumference of the said hollow member.

9. A device of the class described, a frame, a member mounted in said frame for rotary and lateral movements, means for supplying a predetermined quantity of liquid to the inner circumference of the said member, said means including a body portion terminating in a pair of diverging arms, the said arms engaging with the inner circumference of the member at all times.

10. In a liquid applying device for hogs, the combination with a frame, a hollow member movably mounted in said frame, and means for supplying a predetermined quantity of liquid to the inner circumference, said means comprising a rotatable disk, and means engaging with said member and adapted to engage with said disk upon the operation of said annular member.

In testimony whereof I affix my signature.

BENJIMAN F. KNERR.

Copies of this patent may be obtained for five cents each, by addressing the "Commissioner of Patents, Washington, D. C."